3,176,027
PROCESS FOR THE PRODUCTION OF GLYCIDE ETHERS OF MONOHYDRIC PHENOLS

Manfred Budnowski, Dusseldorf-Holthausen, and Manfred Dohr, Dusseldorf, Germany, assignors to Henkel & Cie. G.m.b.H., Dusseldorf-Holthausen, Germany, a corporation of Germany
No Drawing. Filed Mar. 1, 1960, Ser. No. 11,976
Claims priority, application Germany, June 19, 1959,
H 36,694
12 Claims. (Cl. 260—348.6)

The present invention relates to an improved process for the production of glycide ethers of monohydric phenols from the direct interaction of a monohydric phenol with a lower halogen-epoxy-alkane and to the products so produced.

It is known that glycide ethers of monohydric phenols can be prepared by reacting phenols in aqueous or alcoholic solution in the presence of an alkali metal hydroxide with a halogen-epoxy-alkane, such as epichlorohydrin, or with a suitable dihalogen compound, such as dichlorohydrin. Monohydric phenols have also been reacted with epichlorohydrin to form the corresponding chlorohydrin ethers and these ethers have subsequently been transformed into glycide ethers by splitting off hydrogen halide with the aid of an alkaline reacting compound. In all these cases it is necessary to remove the inorganic salt formed by the reaction, such as sodium chloride, either by washing it out with water, by filtration or by distillation.

An object of the invention is the production of glycide ethers of monohydric phenols from the reaction of a monohydric phenol with an excess of a lower halogen-epoxy-alkane in the presence of high-molecular weight catalysts insoluble in the reaction mixture.

Another object of the invention is the production of phenylglycide ether especially useful as a reactive diluent and viscosity reducer for unhardened epoxy resins.

These and oher objects of the invention will become more apparent as the description proceeds.

It has now been found that glycide ethers of monohydric phenols can be produced in simple fashion and without simultaneous formation of inorganic salts, which make it difficult to work up the reaction mixture, as well as with good yields by reacting monovalent phenols at elevated temperatures with an excess of a lower halogen-epoxy-alkane containing a halogen atom vicinal to the epoxide group in the presence of a high-molecular weight catalyst insoluble in the reaction mixture and containing polar groups selected from the groups consisting of salt-like groups, groups capable of forming salt-like groups under the reaction conditions, and acid amide groups. The lower halogen-epoxy-alkane is used in this process in an amount of more than 2 mols per mol of phenol. For isolating the glycide ethers formed by the reaction, the catalyst is separated from the reaction mixture and the excess lower halogen-epoxy-alkane is distilled off and the glycide ether is isolated. For purification, the glycide ether can be fractionally distilled after removing any residual lower halogen-epoxy-alkane or volatile by-products of the reaction such as dichlorohydrin.

As starting materials for the process according to the invention all monohydric phenols having a reactive hydroxyl group attached to the benzene moiety of the molecule may be used. Among such monohydric phenols are phenol, α- or β-naphthol, various substituted phenols which may have one or more identical or different substituents, non-reactive with a lower halogen-epoxy-alkane, attached thereto, such as hydrocarbon radicals, halogen atoms, ether groups, ester groups, acyl radicals, nitro groups, nitrile groups, halophenol, alkyl phenols and especially those having 1 to 18 carbon atoms in the alkyl chains such as cresol, polyalkyl phenols having 1 to 18 carbon atoms in the alkyl chains, such as xylenol and thymol, and the like.

Lower halogen-epoxy-alkanes which contain a halogen atom vicinal to the epoxide group and which are reacted in accordance with the present invention with the monohydric phenols include, for example, epichlorohydrin, epibromohydrin, 1,2-epoxy-3-chlorobutane, 1-chloro-2,3-epoxy-butane, 1-chloro-2,3-epoxy-5-methoxy-pentane and the like. The use of epichlorohydrin as the starting material is preferred. Commercial, technical grade epichlorohydrin with a water content of about 0.1% may be used without purification or drying. The amount of lower halogen-epoxy-alkane required to effect the reaction is more than two mols per mol of phenol. It is advantageous to use the lower halogen-epoxy-alkane in substantially greater excess, for example, in an amount from 5 to 40 mols and more per mol of phenol. The unreacted lower halogen-epoxy-alkane is not changed by the reaction and may readily be recovered and used over again.

Suitable high-moleculer weight catalysts containing polar groups selected from the group consisting of salt-like groups, groups capable of forming salt-like groups under the reaction conditions and acid amide groups, are those materials which do not dissolve in the reaction mixture, during the course of the reaction and which may therefore be readily separated after completion of the reaction by mechanical means. Use of these high-molecular weight catalysts avoids the requirement that the reaction product must be freed from catalyst in a laborious manner, for example, by washing, or that residual amounts of catalyst release undesirable side reactions during the removal of the volatile components of the reaction mixture by distillation.

Primarily suitable as catalysts are those compounds which contain salt-like groups, for example, the salts of high-molecular organic acids, such as alkali metal, ammonium or amine salts of polyacrylic acid. It is particularly advantageous to use the so-called ion exchange resins as catalysts. Cation exchange resins which may contain acid groups, such as sulfonic acid groups, carboxyl groups, phosphonic acid groups and the like, are used for the process according to the present invention in the form of their salts, for example, in the form of their alkali metal, ammonium or amine salts. It is further possible to use anion exchange resins as catalysts, that is, ion exchangers with basic groups, such as amino groups, quaternary ammonium or phosphonium groups as well as ternary sulfonium groups, in the form of their salts, such as in the form of their chlorides or sulfates.

A further group of suitable catalysts includes those high-molecular weight compounds which contain reactive groups which may be transformed into salt-like groups under the prevailing conditions. Examples of such compounds are high-molecular weight organic bases, such as anion exchangers, in the form of their free bases. Also other resins which contain a basic nitrogen atom, which is known to be transformed into quaternary compounds with epihalohydrins under the reaction conditions, are suitable as catalysts, for example, melamine resins or epoxide resins which have been hardened with organic polyamines. Furthermore, high-molecular weight compounds containing divalent sulfur atoms which are capable of being transformed into ternary sulfonium compounds by reaction with lower halogen-epoxy-alkanes may be used as catalysts.

Further suitable catalysts are those high-molecular weight organic compounds which contain acid as well as basic groups in the molecule. Such products include, for example, the ion exchangers which are commercially available under the name of zwitter-ion resins. Of course, it is also possible to use as catalysts the so-called mixed ion exchangers, that is, mixtures of anion exchangers and cation exchangers.

Finally, suitable catalysts include those compounds which contain acid amide groups, such as polyamides, as well as the urea resins.

The above-mentioned catalysts are advantageously used in the process according to the invention in granulated form. Powdery components of the catalysts are advantageously removed by screening and/or washing prior to use. In this manner the separation of the catalyst from the reaction mixture, for example, by centrifuging, decanting or filtering, proceeds extremely smoothly. For filtration relatively coarse filters are sufficient. It is advantageous to employ small mesh wire screens for this purpose.

In general, the catalysts may be used as often as desired because they are not consumed, except for a small degree of mechanical abrasion. In the event that their activity decreases after repeated use they may be regenerated in very simple fashion. The type of regeneration depends upon the chemical structure of the particular catalyst. In many cases washing and swelling with water is sufficient. In other instances the catalysts are regenerated by treatment with salt solutions or with dilute acids or bases. A certain water content of the catalysts in general, does not interfere with the reaction according to the invention and the catalysts may be used in the moist state after regeneration.

The amount of catalyst may vary within wide limits. The optimum amount depends upon the chemical structure of the catalyst and may readily be determined from one case to the other by preliminary tests.

The process according to the present invention can be performed by heating the above-mentioned starting materials and the catalyst together for a few hours. In general the reaction occurs at temperatures above 60° C. It is preferable to avoid temperatures above 200° C. In some cases it is advantageous to add an inert organic solvent to the reaction mixture. If epichlorohydrin is used as the lower halogen-epoxy-alkane, which is particularly advantageous, especially if it is used in large excess, it is recommended to boil the reaction mixture under reflux. After the reaction, the catalyst is separated, for example, by passing the mixture through a fine screen made of V4A stainless steel wire. The separation of the catalyst proceeds extremely smoothly and rapidly in this manner. Thereafter, the excess lower halogen-epoxy-alkane, as well as the volatile reaction products, such as dichlorohydrin, are distilled off, preferably at reduced pressure. Small amounts of water which may be present in the reaction, if water-containing catalysts or technical grade epichlorohydrin are used, are simultaneously removed. The lower halogen-epoxy-alkane which is distilled off may be re-employed in subsequent condensations, possibly after a suitable cleaning procedure. The dihalohydrin formed by the reaction may readily be transformed into epihalohydrin in accordance with known procedures.

The glycide ethers obtained in this manner as a residue are sufficiently pure for many purposes of use. They are especially useful as thinners for unhardened epoxy resins in order to obtain workable viscosities of the unhardened resins. Upon hardening, the glycide ethers react with the epoxy resin molecule to give a hardened resin product which is homogeneous. They may be further purified by distillation at reduced pressure. The components having a higher boiling point than the glycide ethers which are obtained upon fractionation consist, as a rule, of the corresponding chlorohydrin ethers. These may be added to subsequent batches, so that the yield of glycide ethers can be improved.

The following examples will further illustrate the present invention and enable others skilled in the art to understand the invention more completely. It is to be understood, however, that the following examples are not to be construed as limitations on the practice of the invention.

*Example I*

94 gm. of phenol, 2700 gm. of technical grade epichlorohydrin (water content about 0.1%) and 80 gm. of a commercial anion exchanger were heated for 5 hours under reflux while stirring. Subsequently, the catalyst was filtered off. The filtrate was freed from excess epichlorohydrin by distillation at about 40 mm. of Hg. The residue was then fractionated with the aid of a small packed column. 138 gm. of pure distilled, phenylglycide ether were obtained (boiling point at 4 mm. of Hg; 97° to 100° C.).

The anion exchanger used in this example was the commercial product "Dowex 1 X 10". On information supplied by the manufacturer, this product is a strongly basic anion exchanger with a polystyrene base-containing quaternary benzylammonium groups. This ion exchanger was used with equal success in the form of the free base and in the form of the hydrochloric acid salt. In the above example and in Examples II to VI the ion exchanger used was in the water-containing state.

*Example II*

206 gm. of technical grade octylphenol, 3700 gm. of epichlorohydrin and 100 gm. of a commercial anion exchanger were heated under reflux for seven hours while stirring. Subsequently, the reaction mixture was worked up in the manner described in Example I. 232 gm. of octylphenylglycide ether were obtained (boiling point at 0.05 mm. of Hg; 120° to 138° C.).

The anion exchanger used in this example was the commercial product "Lewatit MN" in the form of the water-containing free base.

According to the manufacturer, the anion exchanger "Lewatit MN" is a strongly basic polycondensate which contains $-NR_3^+$ groups.

The run was repeated, the ion exchanger being used in both the form of the sulfuric acid salt and the hydrochloric acid salt. Practically the same result was obtained.

*Example III*

220 gm. of technical grade nonylphenol (boiling point at 10 mm. of Hg; 140 to 172° C.), 3700 gm. of epichlorohydrin and 100 gm. of a commercial anion exchanger ("Lewatit MN" in the form of the sulfuric acid salt) were heated for 6½ hours under reflux while stirring. The reaction mixture was worked up in the manner described above. 251 gm. of nonylphenylglycide ether were obtained (boiling point at 0.05 mm. of Hg; 131° to 158° C.).

*Example IV*

144 gm. of β-naphthol, 3700 gm. of technical grade epichlorohydrin and 80 gm. of a commercial anion exchanger ("Dowex 1 X 10" in the form of its free base) were heated under reflux for 7 hours while stirring. The reaction mixture has worked up in the manner described above. 164 gm. of β-naphthylglycide ether were obtained (boiling point at 0.1 mm. of Hg; 161° to 166° C.).

*Example V*

108 gm. of p-cresol, 3700 gm. of technical grade epichlorohydrin and 80 gm. of a commercial anion exchanger ("Dowex 1 X 10" in the form of the free base) were heated under reflux for 7 hours while stirring. The reaction mixture was worked up in the above described manner. 133 gm. of p-cresylglycide ether were obtained (boiling point at 0.1 mm. of Hg; 90° to 92° C.).

*Example VI*

108 gm. of o-cresol, 3700 gm. of technical grade epichlorohydrin and 100 gm. of a commercial anion exchanger ("Dowex 1 X 10" in the form of its hydrochloric acid salt) were heated for 6 hours under reflux while stirring. The reaction mixture was worked up in the manner described above. 126 gm. of o-cresylglycide ether were obtained (boiling point at 0.1 mm. of Hg; 80° to 82° C.).

*Example VII*

128.5 gm. of p-chlorophenol, 3700 gm. of technical grade epichlorohydrin and 150 gm. of a commercial anion exchanger ("Lewatit MN" in the form of its hydrobromic acid salt) were heated under reflux for 6 hours while stirring. The reaction mixture was worked up in the above described manner. 136 gm. p-chlorophenylglycide ether were obtained (boiling point at 0.2 mm. of Hg; 92° to 93° C.).

*Example VIII*

61 gm. of p-xylenol, 1850 gm. of technical grade epichlorohydrin (water content about 0.1%) and 100 gm. of a commercial, water-containing anion exchanger ("Lewatit MN" in the form of the sulfuric acid salt) were heated under reflux for six hours, accompanied by stirring. Thereafter, the catalyst was removed by filtration. The excess epichlorohydrin was distilled out of the filtrate at about 40 mm. of Hg. The residue was subjected to fractional distillation at about 0.1 mm. of Hg. 87 gm. of a liquid was obtained which boiled at 90° to 92° C. at 0.1 mm. of Hg and which consisted of practically pure p-xylenyl glycide ether.

*Example IX*

2000 gm. of epichlorohydrin were heated with 100 gm. of a commercial, water-containing anion exchanger ("Lewatit MN" in the form of the free base) in a distillation apparatus until no more water was found in the distillate passing over. About 70 gm. of distillate passed over. 75 gm. of thymol were added to the anhydrous mixture. Thereafter, the mixture was heated under reflux for 6 hours, accompanied by stirring. The reaction mixture was worked up as described in Example VIII. 82 gm. of practically pure thymylglycide ether boiling at 94° to 97° C. at 0.2 mm. of Hg were obtained.

*Example X*

47 gm. of phenol, 1300 gm. of epibromohydrin and 150 gm. of nylon in the form of small cubes (commercial product "Zytel" of Du Pont) were heated under reflux for 8 hours, accompanied by stirring. The reaction mixture was worked up as described in Example I. 54 gm. of pure phenylglycide ether were obtained.

*Example XI*

54 gm. of technical grade cresol, 1850 gm. of epichlorohydrin and 100 gm. of a commercial melamine resin, which had been hardened for four hours at 130° C. and then pulverized, were heated under reflux for seven hours accompanied by stirring. The reaction mixture was worked up as described in Example VIII. 62 gm. of cresylglycide ether (boiling point 74° to 82° C. at 0.15 mm. of Hg) were obtained.

*Example XII*

94 gm. of phenol, 3700 gm. of technical grade epichlorohydrin and 80 gm. of an amine-hardened epoxy resin prepared by mixing a commercial epoxy resin and benzidine in a weight ratio of 10 to 4, hardening for six hours at 140° C. and then pulverizing, were heated for 7 hours under reflux accompanied by stirring. Thereafter, the reaction mixture was worked up in the manner described in Example I. 136 gm. of phenylglycide ether were obtained.

*Example XIII*

72 gm. of β-naphthol, 1850 gm. of epichlorohydrin and 100 gm. of a commercial, water-containing cation exchanger ("Lewatit S 100" in the form of its ammonium salt (were heated under reflux for 7 hours accompanied by stirring. The reaction mixture was worked up in the manner described in Example VIII. 81 gm. of β-naphthylglycide ether (boiling point 156° to 161° C. at 0.1 mm. of Hg) were obtained.

The cation exchanger "Lewatit S 100" is a styrene resin which has —SO$_3$H groups attached to the nucleus and is strongly acid.

This run was repeated twice, the ion exchanger being used once in the form of the sodium salt and the other time in the form of the potassium salt. The results were practically the same as when the ammonium salt was used.

The above examples illustrate the process of the invention utilizing a variety of starting monohydric phenols, lower halogen-epoxy-alkanes and catalysts. It will be readily apparent to those skilled in the art that the present invention is not limited to the specific embodiments, and that various changes and modifications may be made without departing from the spirit of the invention or the scope of the appended claims.

We claim:

1. A process for the production of glycidyl ether of monohydric phenol consisting of the steps of reacting at temperatures between about 60° C. and 200° C. a mixture consisting of (1) a monohydric phenol, said phenol having one reactive aromatic-bound hydroxyl group and no other reactive groups in the molecule, (2) mono-halogen-mono-vic.-epoxy-lower-alkane, said halogen being selected from the group consisting of chlorine and bromine and being vicinal to said epoxide group, said mono-halogen-mono-vic.-epoxy-lower-alkane being present in a quantity of more than 5 mols per mol of monohydric phenol, and (3) an organic higher molecular weight catalyst, said catalyst being insoluble in the reaction mixture and being selected from the group consisting of alkali metal, ammonium and amine salts of polyacrylic acid, alkali metal, ammonium and amine salts of cation exchange resins, acid salts of anion exchange resins, the free base of anion exchange resins, melamine resins, epoxide resins hardened with organic polyamines, zwitter-ion exchange resins and nylon, and recovering said glycidyl ether of monohydric phenol.

2. The process of claim 1 wherein said mono-halogen-mono-vic.-epoxy-lower-alkane is present in an amount of from 5 to 40 mols per mol of said monohydric phenol.

3. The process of claim 1 wherein said catalyst is present in an amount of from 80 gms. to 300 gms. per mol of said monohydric phenol.

4. A process for the production of glycidyl ether of monohydric phenol consisting of the steps of reacting at temperatures between about 60° C. and 200° C. a mixture consisting of (1) a monohydric phenol, said phenol having one reactive aromatic-bound hydroxyl group and being selected from the group consisting of phenol, α-naphthol, β-naphthol, alkylphenol having from 1 to 18 carbon atoms in the alkyl, polyalkylphenol having from 1 to 18 carbon atoms in the alkyls and chlorophenol, (2) mono-halogen-mono-vic.-epoxy-lower-alkane, said halogen being selected from the group consisting of chlorine and bromine and being vicinal to said epoxide group, said mono-halogen-mono-vic.-epoxy-lower-alkane being present in a quantity of more than 5 mols per mol of monohydric phenol, and (3) an organic high molecular weight catalyst, said catalyst being insoluble in the reaction mixture and being selected from the group consisting of alkali metal, ammonium and amine salts of polyacrylic acid, alkali metal, ammonium and amine salts of cation exchange resins, acid salts of anion exchange resins, the free base of anion exchange resins, melamine resins, epoxide resins hardened with organic polyamines, zwitter-ion exchange resins and nylon, and recovering said glycidyl ether of monohydric phenol.

5. The process of claim 4 wherein said monohydric phenol is phenol.

6. The process of claim 4 wherein said monohydric phenol is α-naphthol.

7. The process of claim 4 wherein said mono-hydric phenol is chlorophenol.

8. The process of claim 2 wherein said organic high molecular weight catalyst is an alkali metal salt of a cation exchange resin.

9. The process of claim 2 wherein said organic high molecular weight catalyst is an acid salt of an anion exchange resin.

10. The process of claim 2 wherein said organic high molecular weight catalyst is the basic form of an anion exchange resin.

11. The process of claim 2 wherein said organic high molecular weight catalyst is nylon.

12. The process of claim 2 wherein said organic high molecular weight catalyst is an epoxide resin hardened with an organic polyamine.

References Cited in the file of this patent

UNITED STATES PATENTS

| | | |
|---|---|---|
| 2,221,771 | Alquist et al. | Nov. 19, 1940 |
| 2,314,039 | Evans et al. | Mar. 16, 1943 |
| 2,581,464 | Zech | Jan. 8, 1952 |
| 2,864,805 | Cooke | Dec. 16, 1958 |
| 2,898,349 | Zuppinger et al. | Aug. 4 1959 |
| 2,943,096 | Reinking | June 28, 1960 |

FOREIGN PATENTS

| | | |
|---|---|---|
| 554,639 | Belgium | July 31, 1957 |
| 822,686 | Great Britain | Oct. 28, 1959 |

OTHER REFERENCES

Stephenson: Jour. Chem. Soc., pages 1571–7 (1954).

Sussman: Ind. and Eng. Chem., vol. 38, pages 1228–30 (1946).

Nachod: Ion Exchange—Theory and Application, Academic Press, N.Y., pages 265–72 (1949).

Davies: Chemistry and Industry—pp. 51–54 (1948).

Kressman: Chemistry and Industry—pages 64–69 (1956).

Kressman: Manufacturing Chemist, pages 454–8 (1956).